US012531368B2

(12) United States Patent
Choi et al.

(10) Patent No.: US 12,531,368 B2
(45) Date of Patent: Jan. 20, 2026

(54) CONNECTION CABLE LOCKING DEVICE

(71) Applicant: COMXI Co., Ltd., Seoul (KR)

(72) Inventors: Yong Un Choi, Cheonan-si (KR); Byong Ju Bae, Asan-si (KR); Hyun Soo Lim, Cheonan-si (KR)

(73) Assignee: COMXI Co., Ltd., Seoul (KR)

( * ) Notice: Subject to any disclaimer, the term of this patent is extended or adjusted under 35 U.S.C. 154(b) by 349 days.

(21) Appl. No.: 18/327,489

(22) Filed: Jun. 1, 2023

(65) Prior Publication Data

US 2023/0396019 A1 Dec. 7, 2023

(30) Foreign Application Priority Data

Jun. 3, 2022 (KR) ........................ 10-2022-0067984

(51) Int. Cl.
*H01R 13/627* (2006.01)
*H01R 13/42* (2006.01)

(52) U.S. Cl.
CPC ......... *H01R 13/6272* (2013.01); *H01R 13/42* (2013.01)

(58) Field of Classification Search
CPC ............................ H01R 13/6272; H01R 13/42
See application file for complete search history.

(56) References Cited

U.S. PATENT DOCUMENTS 5,505,638 A * 4/1996 Su .......................... H01R 24/62 439/701
5,829,280 A * 11/1998 Chen ..................... E05B 67/003 70/386
7,354,291 B2 * 4/2008 Caveney ............ H01R 13/6397 439/352
7,578,690 B2 * 8/2009 Caveney ............ H01R 13/6397 439/344
8,545,243 B2 * 10/2013 Lin .................... H01R 13/6397 439/133
9,735,506 B2 * 8/2017 Tsay ................... H01R 13/6397
9,735,507 B1 * 8/2017 Liang ................. H01R 13/6397
10,069,242 B1 * 9/2018 Wen ................... H01R 13/6275
10,637,189 B1 * 4/2020 Ahn ..................... H01R 13/627
2007/0207667 A1 9/2007 Caveney et al.
2021/0278600 A1 9/2021 Gniadek et al.

FOREIGN PATENT DOCUMENTS

CN 209786325 U 12/2019
DE 20 2019 005 454 U1 10/2020
KR 10-2067747 B1 1/2020

* cited by examiner

*Primary Examiner* — Thanh T Le
(74) *Attorney, Agent, or Firm* — United One Law Group LLC; Kongsik Kim; Jhongwoo Peck

(57) ABSTRACT

A connection cable locking device is configured to selectively hold an elastic hook provided on a connection head of a connection cable, thereby preventing an arbitrary operation of the elastic hook and also preventing the connection head coupled to the connection port from being separated. The connection cable locking device includes a device body provided with a holding operation space and a locking operation space in communication with the holding operation space, a holding member having elasticity and pivotably coupled to the holding operation space so as to hold the elastic hook provided on the connection head of the connection cable, and a locking member slidably coupled to the locking operation space so as to press the holding member.

8 Claims, 9 Drawing Sheets

CONNECTION CABLE LOCKING DEVICE

CROSS REFERENCE TO RELATED APPLICATION

The present application claims priority to Korean Patent Application No. 10-2022-0067984, filed Jun. 3, 2022, which application is incorporated herein by reference in its entirety.

BACKGROUND

1. Technical Field

The present disclosure relates to a connection cable locking device. More particularly, the present disclosure relates to a connection cable locking device configured to selectively hold an elastic hook provided on a connection head of a connection cable, thereby preventing an arbitrary operation of the elastic hook and also preventing the connection head coupled to the connection port from being separated.

2. Description of the Related Art

With development of industries and technologies, the spread of electronic devices such as computers, modems, and so on has rapidly increased. Furthermore, most organizations such as companies and government offices use electronic devices such as server computers, personal computers (including laptops), tablet computers, and mobile devices to perform tasks, and various facilities such as machinery and factory facilities, industrial facilities, and military facilities are also controlled by the electronic devices.

As industries have been reorganized with tasks using electronic devices having computer functions, important information leakage has often occurred by infecting malignant codes or electronic viruses into other electronic device maliciously.

In consideration of this, various measures have been applied to prevent information leakage and protect information from penetration of electronic viruses in information offices, companies, government offices, and military facilities.

An electronic device is provided with an optical port for connecting an optical cable that transmits an optical signal, and an optical head provided on the optical cable is detachably coupled to the optical port. Here, the optical port is provided with a hook engaging portion, and the optical head is provided with an elastic hook which has elasticity and which is capable of being pivotably moved. When the elastic hook is engaged with and coupled to the hook engaging portion, the optical head is coupled to the optical port and an optical signal is transmitted to the optical port. Furthermore, when an engagement coupling of the elastic hook is released from the hook engaging portion by arbitrarily operating the elastic hook, the optical head is capable of being detached from the optical port, so that an optical signal transmission may be blocked.

However, since the engagement coupling of the elastic hook is released from the hook engaging portion due to the arbitrary operation of the elastic hook, a device for stably maintaining an engagement coupling state between the hook engaging portion and the elastic hook by preventing the arbitrary operation of the elastic hook has been required.

SUMMARY

Accordingly, the present disclosure has been made keeping in mind the above problems occurring in the related art, and an objective of the present disclosure is to provide a connection cable locking device configured to selectively hold an elastic hook provided on a connection head of a connection cable, thereby preventing an arbitrary operation of the elastic hook and also preventing the connection head coupled to the connection port from being separated.

In order to achieve the above objective, according to an exemplary embodiment of the present disclosure, there is provided a connection cable locking device including: a device body provided with a holding operation space and a locking operation space in communication with the holding operation space; a holding member having elasticity and pivotably coupled to the holding operation space so as to hold an elastic hook provided on a connection head of a connection cable; and a locking member slidably coupled to the locking operation space so as to press the holding member.

Here, the device body may include a rod seating portion on which a portion of the holding member is supported and seated.

Here, the device body may include at least one of: a cover wing covering the holding member that protrudes from the device body when the holding member is coupled to the holding operation space; and the rod seating portion on which the portion of the holding member is supported and seated.

Here, the holding operation space may include a holding engaging portion, and the holding member may include: an engaging coupling block provided with a block engaging portion that is engaged with and coupled to the holding engaging portion; a support rod that protrudes on the engaging coupling block such that the support rod protrudes toward the elastic hook from the device body; and a pivot rod which has elasticity and which protrudes on the engaging coupling block such that the pivot rod protrudes toward the elastic hook from the device body.

At this time, when the locking member presses the pivot rod in response to a slide movement of the locking member, the pivot rod may have elasticity and may be pivotably moved, and at least one of an end portion of the support rod and an end portion of the pivot rod may maintain a holding state of the elastic hook.

Here, a holding groove portion into which the elastic hook is inserted may be recessively formed at least one of the end portion of the support rod and the end portion of the pivot rod.

Here, a gap protrusion portion may protrude any one of the support rod and the pivot rod, the gap protrusion portion being capable of being in contact with or in close contact with other one of the support rod and the pivot rod when the end portion of the support rod and the end portion of the pivot rod hold the elastic hook.

Here, the locking member may include a pushing protrusion portion configured to press the pivot rod in response to the slide movement of the locking member.

Here, any one of the locking operation space and the locking member may include a locking hook, and other one of the locking operation space and the locking member may include: a locking reciprocating guide forming a movement path of the locking hook; a release seating portion where the locking hook is engaged with and supported at a first side of the locking reciprocating guide; and a locking seating portion which is spaced apart from the release seating portion and where the locking hook is engaged with and supported at a second side of the locking reciprocating guide.

The connection cable locking device of the present disclosure may further include a lock releasing key detachably coupled to the locking member for the slide movement of the locking member.

According to the connection cable locking device of the present disclosure, an arbitrary operation of the elastic hook may be prevented by selectively holding the elastic hook that is provided on the connection head of the connection cable, and also the connection head coupled to the connection port may be prevented from being separated.

In addition, by a detailed coupling relationship of the rod seating portion, a slide movement of the holding member in the holding operation space may be restricted, and a holding state of the elastic hook by the holding the member may be stably maintained.

In addition, by a detailed coupling relationship of the device body, coupling between the connection head and the device body may be clarified, and the device body may be prevented from being arbitrarily separated from the connection head.

In addition, by a detailed coupling relationship of the holding member, a pivot movement of the pivot rod with respect to the support rod may be clarified, and a state in which the end portion of the support rod and the end portion of the pivot rod are splayed in the lock releasing state of the elastic hook may be stably maintained.

In addition, by a coupling relationship of the holding groove portion, the elastic hook may not be arbitrarily operated when at least one of the end portion of the support rod and the end portion of the pivot rod holds the elastic hook.

In addition, by an engagement coupling relationship of the holding member in the holding operation space, the holding member may be prevented from being arbitrarily separated in the holding operation space, and the holding member may be positioned in a correct position in the device body when the holding body holds the elastic hook.

In addition, by a detailed coupling relationship of the support rod, a space of the holding groove portion may be secured, and the support rod may be positioned at a correct position in the holding operation space.

In addition, by a detailed coupling relationship of the pivot rod, the space of the holding groove portion may be secured, the pivot movement of the pivot rod between the holding operation space and the locking operation space may be smoothly performed, and the pivot rod may be positioned at a correct position between the holding operation space and the locking operation space while the elastic hook is in the lock releasing state.

In addition, by a detailed coupling relationship of the pushing protrusion portion, the pivot rod may be smoothly pressed when the locking member is slidably moved.

In addition, by a detailed coupling relationship of the gap protrusion portion, the elastic hook may be smoothly held, and deformation or breakage of the elastic hook by the holding member may be prevented.

In addition, by a detailed coupling relationship of the locking member in the locking operation space, a slide movement of the locking member may be smoothly performed, and the locking member may be positioned at a correct position in the lock releasing state of the elastic hook and the lock setting state of the elastic hook.

In addition, by a slide movement coupling relationship of the locking member in the locking operation space, the slide movement of the locking member in the locking operation space may be smoothly performed.

In addition, by a coupling relationship of the lock releasing key, the slide movement of the locking member in the locking operation space may be clarified.

In addition, by a coupling relationship between the locking member and the lock releasing key, the lock releasing key may be easily detached from and attached to the locking member.

BRIEF DESCRIPTION OF THE DRAWINGS

The above and other objectives, features, and other advantages of the present disclosure will be more clearly understood from the following detailed description when taken in conjunction with the accompanying drawings, in which:

FIGS. 7A and 7B are front cross-sectional views illustrating a coupling state of a device body and a holding member in the connection cable locking device according to an embodiment of the present disclosure, in which FIG. 7A illustrates a lock releasing state and FIG. 7B illustrates the lock setting state;

FIGS. 8A and 8B are front cross-sectional views illustrating a coupling state of the device body and a locking member in the connection cable locking device according to an embodiment of the present disclosure, in which FIG. 8A illustrates the lock releasing state and FIG. 8B illustrates the lock setting state; and FIGS. 9A and 9B are front cross-sectional views illustrating a coupling state of the device body, the holding member, and the locking member in the connection cable locking device according to an embodiment of the present disclosure, in which FIG. 9A illustrates the lock releasing state and FIG. 9B illustrates the lock setting state.

DETAILED DESCRIPTION

Hereinafter, an embodiment of a connection cable locking device according to the present disclosure will be described with reference to the accompanying drawings. Here, the present disclosure is not restricted or limited to the embodiment. In addition, a detailed description related to a known function or configuration in describing the present disclosure may be omitted for clarity of the present disclosure.

Figure 1:
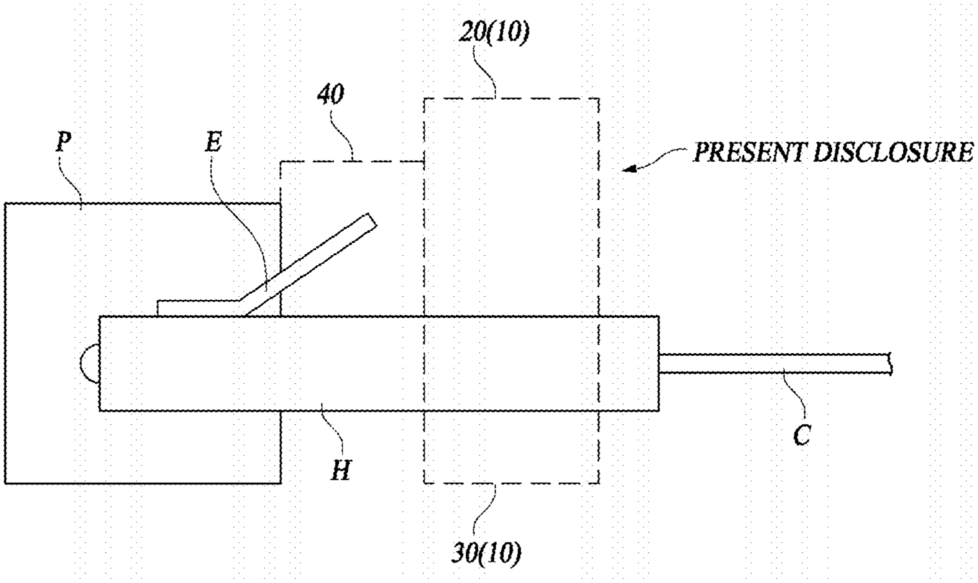
FIG. 1 is a view illustrating a state in which a connection cable locking device according to an embodiment of the present disclosure is coupled to a connection port.
Figure 2:
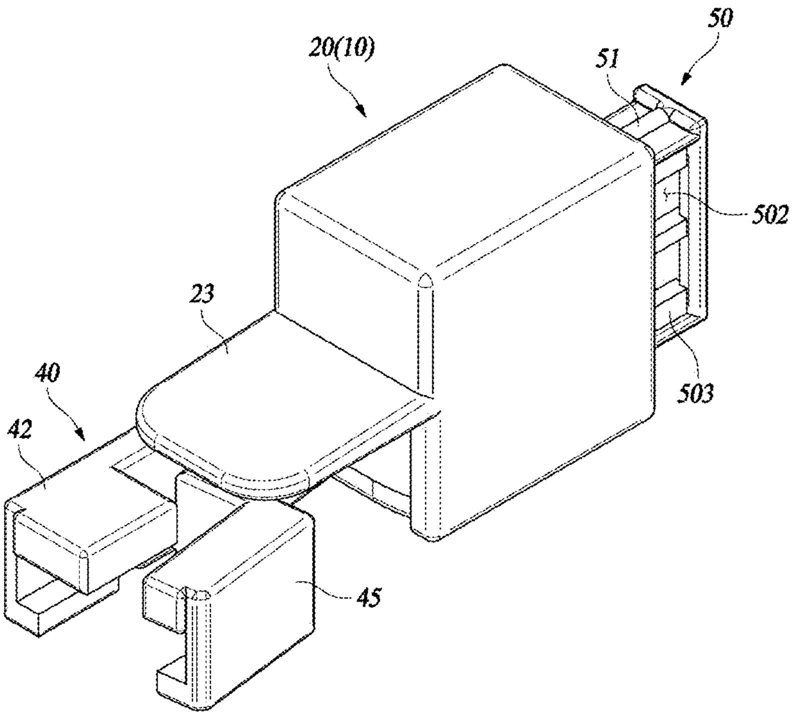
FIG. 2 is a perspective view illustrating the connection cable locking device according to an embodiment of the present disclosure.
Figure 3:
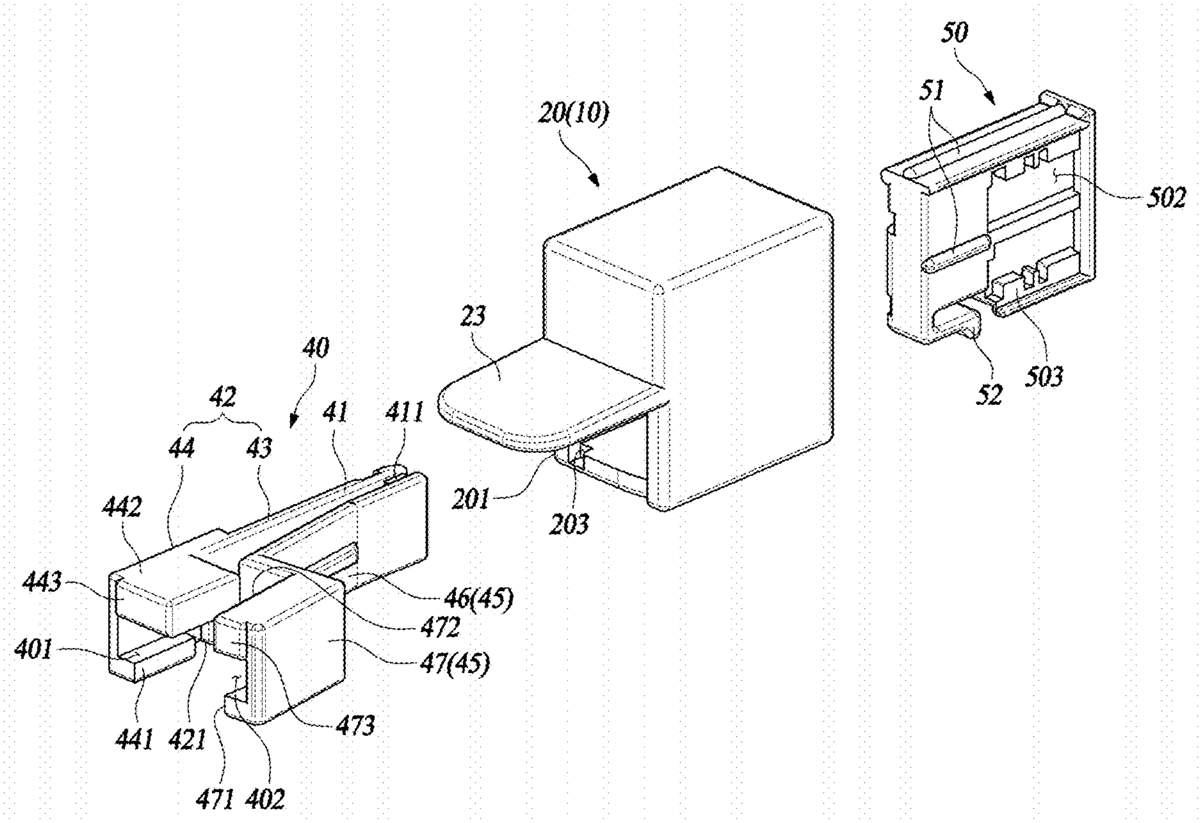
FIG. 3 is a front exploded perspective view of FIG. 2.
Figure 4:
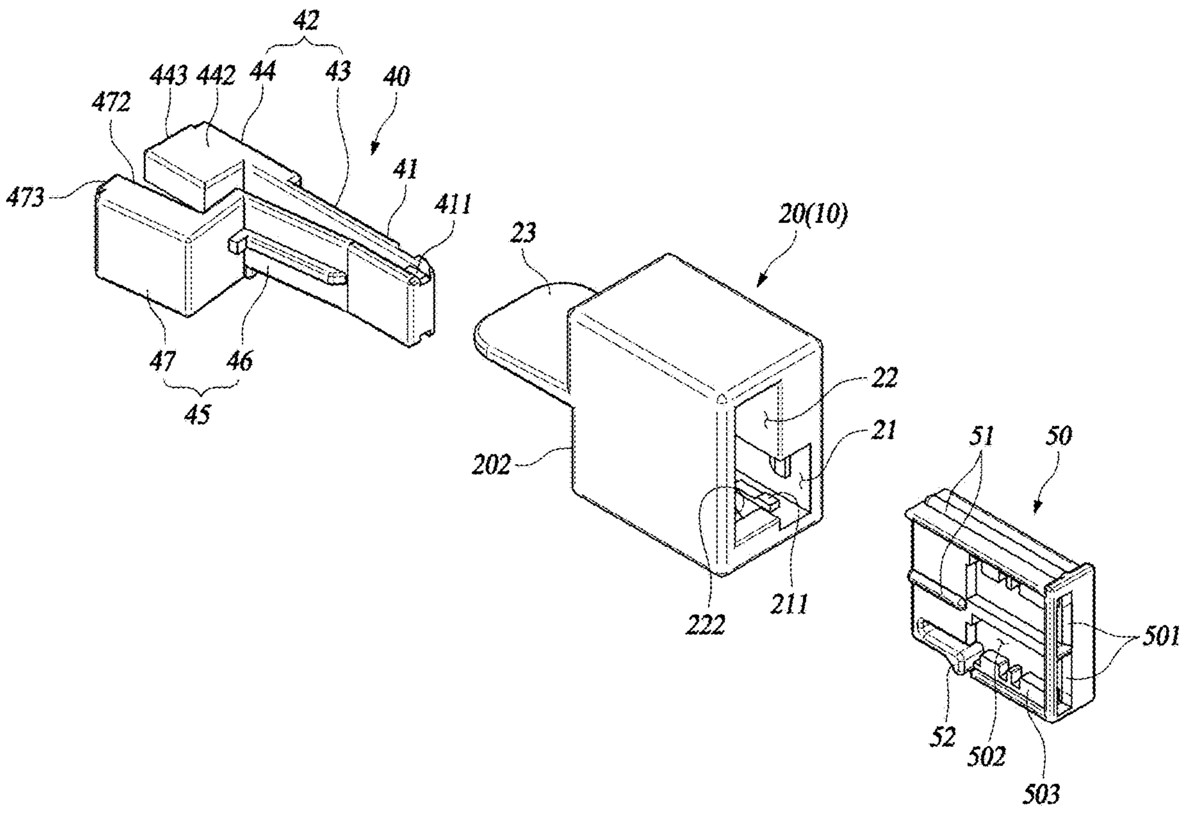
FIG. 4 is a rear exploded perspective view of FIG. 2.
Figure 5:
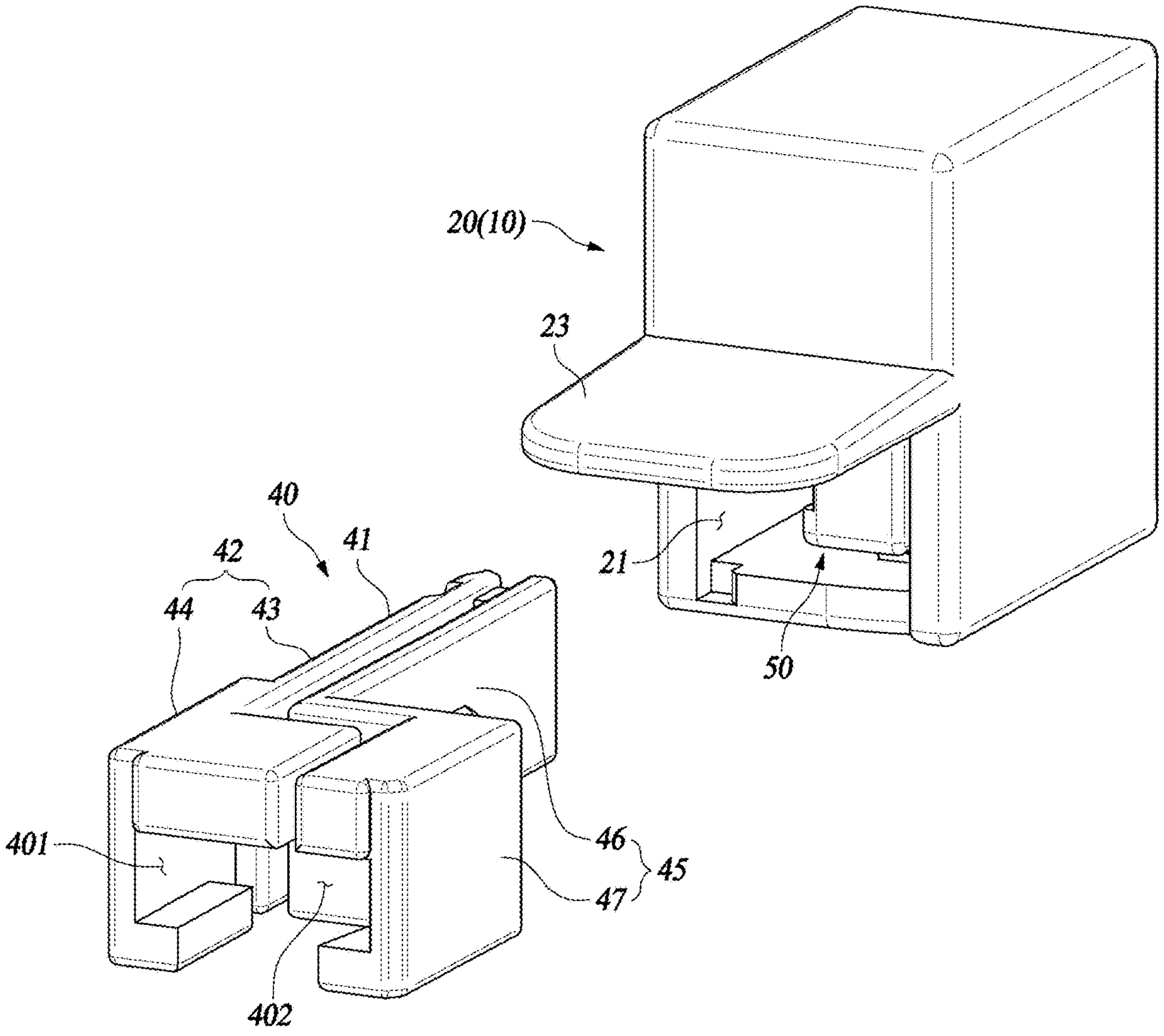
FIG. 5 is a first exploded perspective view illustrating a lock setting state of the connection cable locking device according to an embodiment of the present disclosure.
Figure 6:
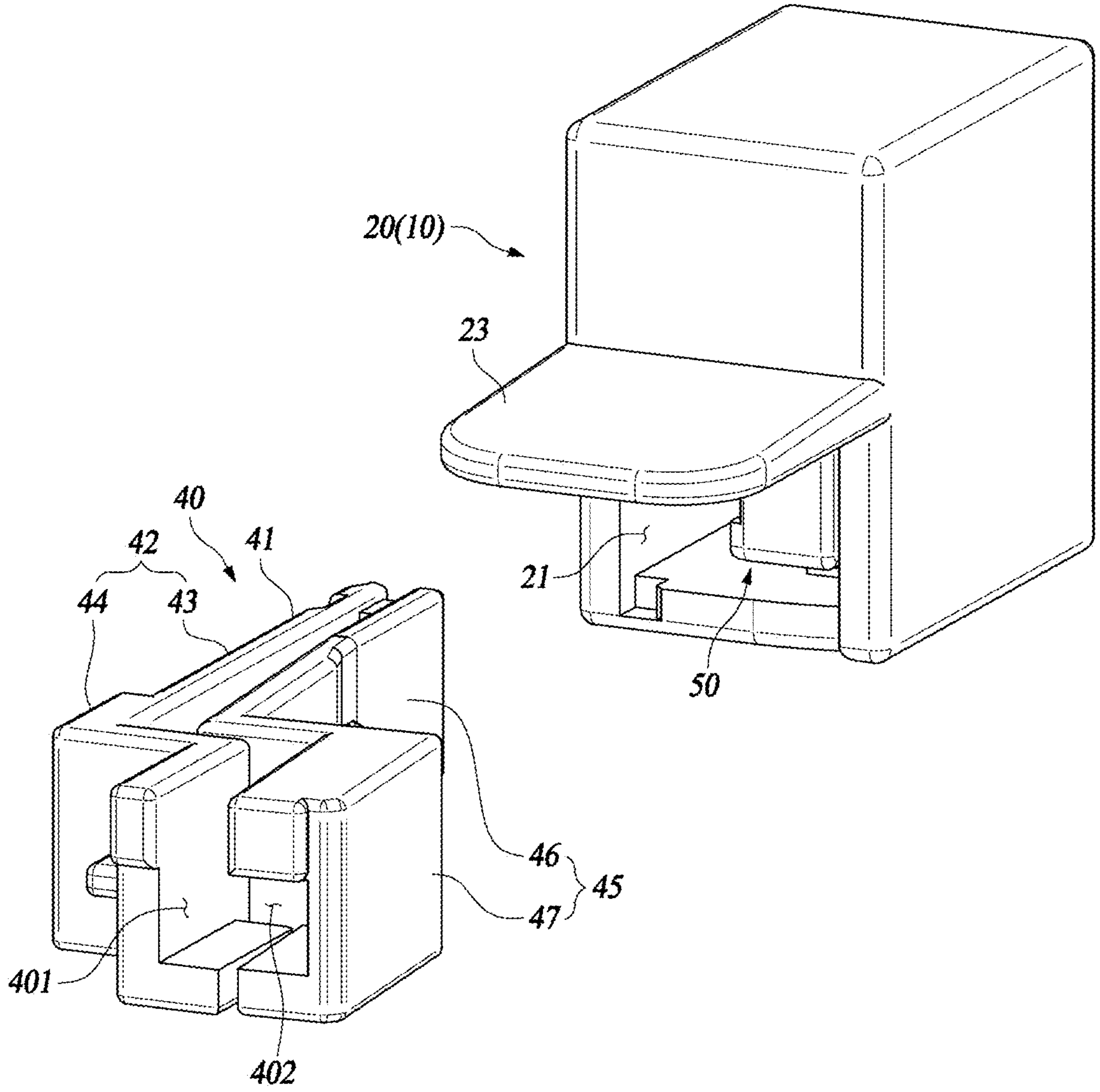
FIG. 6 is a second exploded perspective view illustrating the lock setting state of the connection cable locking device according to an embodiment of the present disclosure.
Figure 7A:
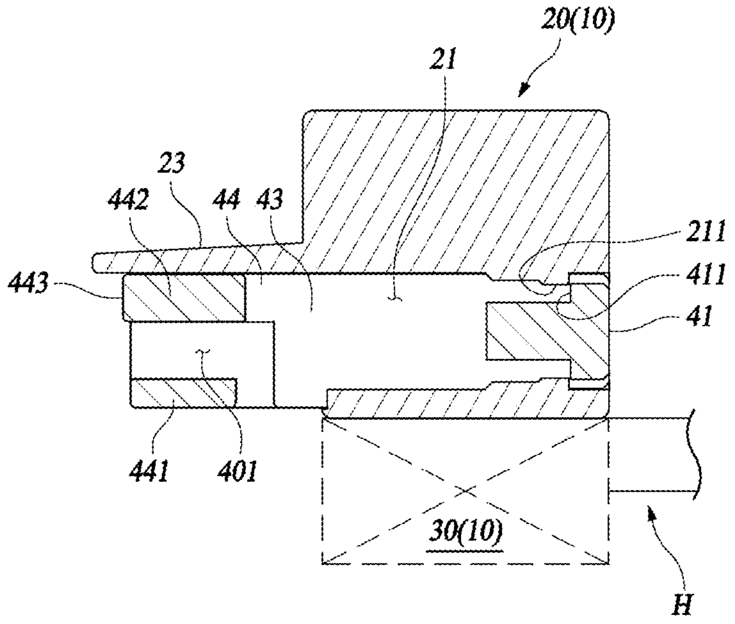
Figure 7B:
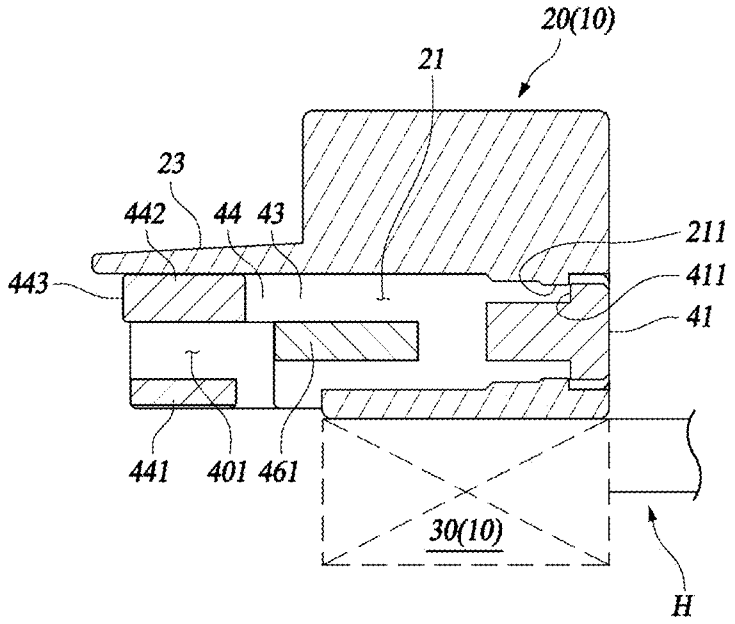
Figure 8A:
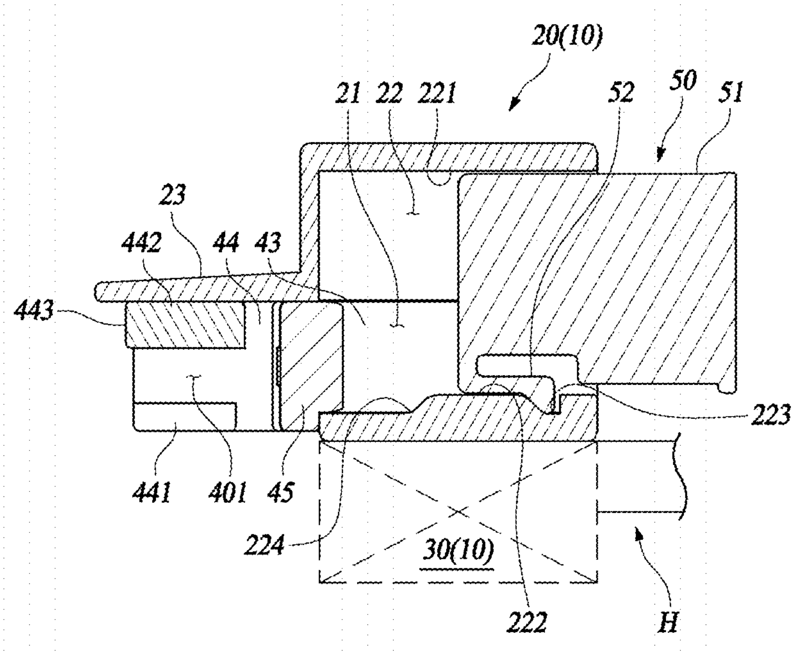
Figure 8B:
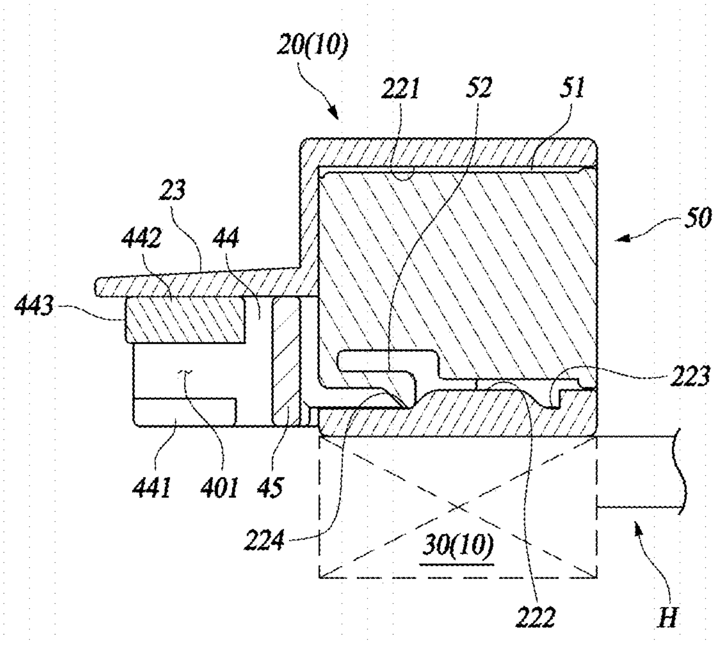
Figure 9A:
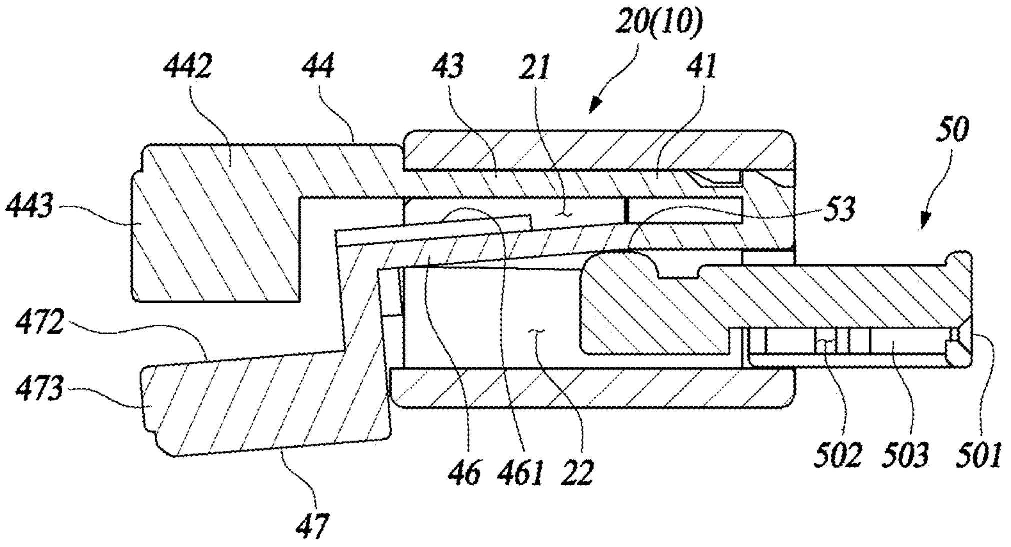
Figure 9B:
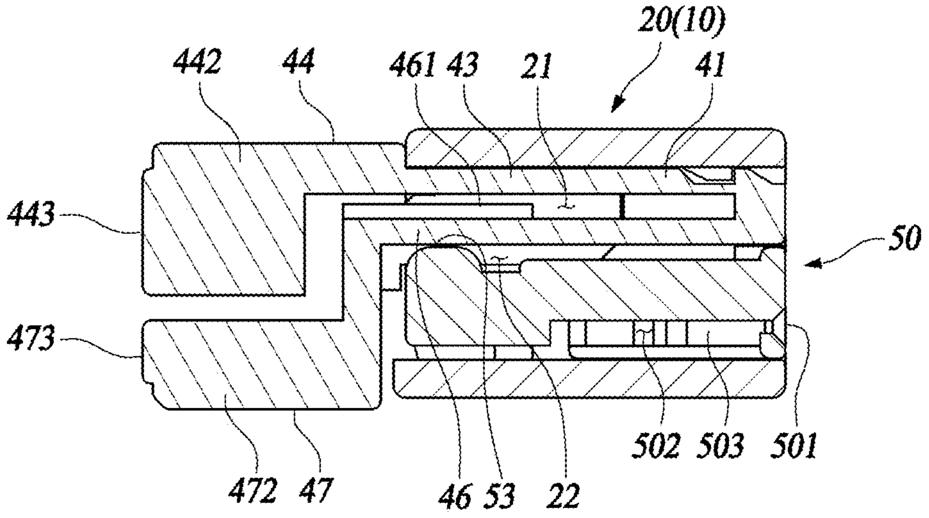

Referring to FIG. 1 to FIG. 9B, an electronic device is provided with a connection port P for connecting a connection cable C that transmits a signal, and a connection head H provided at an end portion of the connection cable C is detachably coupled to the connection port P. Here, a hook engaging portion is provided at the connection port P, and an elastic hook E having elasticity is pivotably provided at the connection head H. When the elastic hook E is engaged with the hook engaging portion, the connection head H is connected to the connection port P, and a signal is transmitted to the connection port P. Furthermore, when the engagement of the elastic hook E is released from the hook engaging portion by arbitrarily operating the elastic hook E, the connection head H is capable of being separated from the connection port P, so that a transmission of a signal is capable of being blocked.

The connection cable locking device according to an embodiment of the present disclosure is configured to hold the elastic hook E provided on the connection cable C, may include a device body 10, a holding member 40, and a locking member 50, and may further include a lock releasing key.

Among an operation body 20 to which the holding member 40 and the locking member 50 are coupled and a support body 30 configured to couple the operation body 20 to the connection head H, the device body 10 may at least include the operation body 20. Here, as a coupling relationship between the support body 30 and the connection head H, various types of known coupling structures and known fitting coupling structures may be applied. It is advantageous that the device body 10 is coupled to the connection head H provided at the connection cable C.

In the device body 10, the operation body 20 is provided with a holding operation space 21 to which the holding member 40 is coupled, and is provided with a locking operation space 22 which is in communication with the holding operation space 21 and to which the locking member 50 is coupled. Since the holding operation space 21 and the locking operation space 22 are in communication with each other, a portion of the holding member 40 may be disposed in the locking operation space 22 while the elastic hook E is in a lock releasing state.

The holding operation space 21 may be provided with a holding engaging portion 211 for engaging with the holding member 40.

The locking operation space 22 may be provided with a locking guide 221 that forms a slide movement path of a locking slider 51 provided on the locking member 50.

The locking operation space 22 may be provided with a hook restriction portion for restricting a slide movement of a locking hook 52 provided on the locking member 50. The hook restriction portion may include a locking reciprocating guide 222 that forms a movement path of the locking hook 52, a release seating portion 223 where the locking hook 52 is engaged and supported at a first side of the locking reciprocating guide 222, and a locking seating portion 224 which is spaced apart from the release seating portion 223 and where the locking hook 52 is engaged and supported at a second side of the locking reciprocating guide 222.

In the device body 10, the operation body 20 may be provided with a rod seating portion where a portion of the holding member 40 is seated and supported. The rod seating portion may include at least one of a support seating portion 201 on which a support jaw provided on a support rod 42 of the holding member 40 is seated and supported, a pivot seating portion 202 on which a pivot jaw provided on a pivot rod 45 of the holding member 40 is seated and supported, and a restriction seating portion 203 on which a restriction protrusion portion 421 provided on the support rod 42 of the holding member 40 is seated and supported.

In the device body 10, the operation body 20 may be provided with a cover wing 23 covering the holding member 40 that protrudes from the operation body 20 when the holding member 40 is coupled to the holding operation space 21. The cover wing 23 protrudes from the operation body 20 at an entrance edge of the holding operation space 21. Since the cover wing 23 covers the holding member 40, an arbitrary operation of the holding member 40 may be prevented, and a state in which the holding member 40 holds the elastic hook E provided on the connection head H may be stably maintained.

In the device body 10, the support body 30 may stably couple and fix the operation body 20 to the connection head H by using known various forms.

The holding member 40 may hold the elastic hook E provided on the connection head H. The holding member 40 has elasticity and is pivotably coupled to the holding operation space 21.

When the locking member 50 presses the pivot rod 45 in response to the slide movement of the locking member 50, the pivot rod 45 is pivoted with elasticity, and at least one of an end portion of the support rod 42 and an end portion of the pivot rod 45 is capable of maintaining a holding state of the elastic hook E.

The holding member 40 may include an engaging coupling block 41 provided with a block engaging portion 411 that is engaged with the holding engaging portion 211, the support rod 42 that protrudes on the engaging coupling block 41 such that the support rod 42 protrudes toward the elastic hook E from the device body 10, and the pivot rod 45 which has elasticity and which protrudes on the engaging coupling block 41 such that the pivot rod 45 protrudes toward the elastic hook E from the device body 10.

Generally, when the holding engaging portion 211 protrudes, the block engaging portion 411 is recessively formed. Furthermore, when the holding engaging portion 211 is recessively formed, the block engaging portion 411 protrudes.

The support rod 42 may include a support extension portion 43 which extends from the engaging coupling block 41 and which is supported on the holding operation space 21, and may include a first holding extension portion 44 that extends from the support extension portion 43 so as to hold or support the elastic hook E. It is illustrated in the drawings that a first holding groove portion 401 into which the elastic hook E is inserted is recessively formed in the first holding extension portion 44.

The support rod 42 may be provided with a restriction protrusion portion 421 that is engaged with and supported on the restriction seating portion 203 according an engagement between the holding engaging portion 211 and the block engaging portion 411.

The support rod 42 may be provided with the support jaw that is engaged with and supported on the support seating portion 201 according to the engagement between the holding engaging portion 211 and the block engaging portion 411. It is preferable that the support jaw is formed at a boundary portion between the support extension portion 43 and the first holding extension portion 44.

A first restriction protrusion portion 443 protrudes on the support rod 42, so that a holding position of the elastic hook E may be clarified. The first restriction protrusion portion 443 may protrude from any one of an end portion of the first holding extension portion 44, a first operation engaging portion 441, and a first operation covering portion 442.

The pivot rod 45 may include a pivot extension portion 46 which is separated from the support extension portion 43 of the support rod 42 and which extends from the engaging coupling block 41, the pivot extension portion 46 having elasticity and being pivotably provided, and may include a second holding extension portion 47 that protrudes from the pivot extension portion 46 so as to hold or support the elastic hook E. It is illustrated in the drawings that a second holding groove portion 402 into which the elastic hook E is inserted is recessively formed in the second holding extension portion 47.

The pivot rod 45 may be provided with the pivot jaw that is engaged with and supported on the pivot seating portion 202 according to the engagement between the holding engaging portion 211 and the block engaging portion 411. It is preferable that the pivot jaw is formed at a boundary portion between the pivot extension portion 46 and the second holding extension portion 47.

A second restriction protrusion portion 473 protrudes on the pivot rod 45, so that a holding position of the elastic hook E may be clarified. The second restriction protrusion portion 473 may protrude from any one of an end portion of the second holding extension portion 47, a second operation engaging portion 471, and a second operation covering portion 472.

It is advantageous that a holding groove portion into which the elastic hook E is inserted is formed at least one of the end portion of the support rod 42 and the end portion of the pivot rod 45. The holding groove portion may include at least one of the first holding groove portion 401 provided in the first holding extension portion 44 that is the end portion of the support rod 42 and the second holding groove portion 402 provided in the end portion of the second holding extension portion 47 that is the end portion of the pivot rod 45.

At this time, the first holding groove portion 401 may be formed by at least one of the first operation engaging portion 441 and the first operation covering portion 442 which are spaced apart from each other and which protrude from the first holding extension portion 44.

In addition, the second holding groove portion 402 may be formed by at least one of the second operation engaging portion 471 and the second operation covering portion 472 which are spaced apart from each other and which protrude from the second holding extension portion 47.

The first operation engaging portion 441 or the second operation engaging portion 471 prevents the elastic hook E from approaching the connection head H, and the first operation covering portion 442 or the second operation covering portion 472 restricts a pressing operation of the elastic hook E, so that the engagement between the elastic hook E and the hook engaging portion may be maintained when the holding member 40 holds the elastic hook E.

A gap protrusion portion 461 may protrude any one of the support rod 42 and the pivot rod 45, the gap protrusion portion 461 being capable of being in contact with or in close contact with other one of the support rod 42 and the pivot rod 45 when the end portion of the support rod 42 and the end portion of the pivot rod 45 hold the elastic hook E.

The locking member 50 is slidably coupled to the locking operation space 22 so as to press the holding member 40.

The locking member 50 is provided with a key detachment portion for coupling with the lock releasing key. The key detachment portion may include a key groove portion 501 into which a key protrusion portion of the lock releasing key is fitted and coupled, a key coupling space 502 in communication with the key groove portion 501 and forming a space where the key protrusion portion is moved, and a key coupling portion 503 in which the key protrusion portion is engaged with and coupled to the key coupling space 502.

The locking member 50 may include the locking slider 51 which is fitted into and coupled to the locking guide 221 and which is capable of being slidably moved along the locking guide 221. When the locking guide 221 is provided on the locking member 50, the locking slider 51 may be provided in the locking operation space 22.

The locking member 50 may include the locking hook 52 which is coupled to a hook restriction portion and which is capable of being slidably moved along the hook restriction portion. When the hook restriction portion is provided on the locking member 50, the locking hook 52 may be provided in the locking operation space 22. In another expression, the locking hook 52 may be provided in any one of the locking operation space 22 and the locking member 50, and the hook restriction portion may be provided in other one of the locking operation portion 22 and the locking member 50. At this time, the hook restriction portion may include the locking reciprocating guide 222 that forms the movement path of the locking hook 52, the release seating portion 223 where the locking hook 52 is engaged and supported at the first side of the locking reciprocating guide 222, and the locking seating portion 224 which is spaced apart from the release seating portion 223 and where the locking hook 52 is engaged and supported at the second side of the locking reciprocating guide 222.

A pushing protrusion portion 53 that presses the pivot rod 45 in response to the slide movement of the locking member 50 may protrude on the locking member 50.

The lock releasing key is detachably coupled to the locking member 50 for the slide movement of the locking member 50. Since the lock releasing key is disclosed in various disclosures filed by the present applicant, so that a detailed description of the lock releasing key will be omitted.

In the lock releasing state, the device body 10 is coupled to the connection head H, the end portion of the first holding extension portion 44 and the end portion of the second holding extension portion 47 are spaced apart from each other and are positioned on opposite sides of the elastic hook E, and the locking hook 52 is in a state in which the locking hook 52 is engaged with and supported on the release seating portion 223. At this time, when the locking hook 52 is inserted into the locking operation space 22, the locking hook 52 is switched to the lock setting state. Furthermore, when the locking hook 52 inserted into the locking operation space 22 is pulled by using the lock releasing key so as to protrude the locking hook 52, the locking hook 52 is switched to the lock releasing state.

More specifically, in a state in which the end portion of the first holding extension portion 44 and the end portion of the second holding extension portion 47 are disposed on the opposite sides of the elastic hook E, when the locking member 50 is slidably moved in the locking operation space 22, the locking hook 52 is separated from a lock releasing portion and then is engaged with and supported on the locking seating portion 224 by passing through the locking reciprocating guide 222. At this time, as the pushing protrusion portion 53 presses the pivot extension portion 46 of the pivot rod 45, the end portion of the first holding extension portion 44 approaches the end portion of the second holding extension portion 47, so that at least one of the end portion of the first holding extension portion 44 and the end portion of the second holding extension portion 47 covers the elastic hook E, thereby realizing the lock setting state. Accordingly, since the elastic hook E is not capable of being operated arbitrarily, a state in which the elastic hook E is engaged with and coupled to the hook engaging portion is stably maintained.

Conversely, when a protrusion portion operating portion is operated after the key protrusion portion that protrudes on a key body of the lock releasing key is inserted into the key groove portion 501, the key protrusion portion is moved in the key coupling space 502 and is engaged with and coupled to the key coupling portion 503. Then, when the lock releasing key is pulled out, the locking hook 52 is separated from the locking seating portion 224, and is engaged with and supported on the release seating portion 223 by passing through the locking reciprocating guide 222. At this time, the pushing protrusion portion 53 is moved toward a locking coupling protrusion portion of the pivot rod 45, and the pivot rod 45 is returned to an original position by an elastic force and the pivot jaw is seated and supported on the pivot seating portion 202, so that the end portion of the first holding extension portion 44 and the end portion of the second holding extension portion 47 are disposed on the opposite sides of the elastic hook E, thereby realizing the lock releasing state. Accordingly, the elastic hook E may be operated arbitrarily.

When the lock releasing key is pulled continuously, the locking member 50 may be detached from the device body 10.

In FIGS. 7A to 9B, the lock releasing state is described as an opened state, and the lock setting state is described as a locked state.

In the connection cable locking device according to an embodiment of the present disclosure, it is illustrated in the drawings that the elastic hook E provided on an optical head is held when the optical head provided on an optical cable is coupled to an optical port, but there is no limitation. Furthermore, the elastic hook E provided on various connection heads H can be held such as holding the elastic hook E provided on a LAN head when the LAN head provided on a LAN cable is coupled to a LAN port.

According to the connection cable locking device described above, an arbitrary operation of the elastic hook E may be prevented by selectively holding the elastic hook E that is provided on the connection head H of the connection cable C, and also the connection head H coupled to the connection port P may be prevented from being separated.

In addition, by a detailed coupling relationship of the rod seating portion, a slide movement of the holding member 40 in the holding operation space 21 may be restricted, and a holding state of the elastic hook E by the holding the member 40 may be stably maintained.

In addition, by a detailed coupling relationship of the device body 10, coupling between the connection head H and the device body 10 may be clarified, and the device body 10 may be prevented from being arbitrarily separated from the connection head H.

In addition, by a detailed coupling relationship of the holding member 40, a pivot movement of the pivot rod 45 with respect to the support rod 42 may be clarified, and a state in which the end portion of the support rod 42 and the end portion of the pivot rod 45 are splayed in the lock releasing state of the elastic hook E may be stably maintained.

In addition, by a coupling relationship of the holding groove portion, the elastic hook E may not be arbitrarily operated when at least one of the end portion of the support rod 42 and the end portion of the pivot rod 45 holds the elastic hook E.

In addition, by an engagement coupling relationship of the holding member 40 in the holding operation space 21, the holding member 40 may be prevented from being arbitrarily separated in the holding operation space 21, and the holding member 40 may be positioned in a correct position in the device body 10 when the holding body 40 holds the elastic hook E.

In addition, by a detailed coupling relationship of the support rod 42, a space of the holding groove portion may be secured, and the support rod 42 may be positioned at a correct position in the holding operation space 21.

In addition, by a detailed coupling relationship of the pivot rod 45, the space of the holding groove portion may be secured, the pivot movement of the pivot rod 45 between the holding operation space 21 and the locking operation space 22 may be smoothly performed, and the pivot rod 45 may be positioned at a correct position between the holding operation space 21 and the locking operation space 22 while the elastic hook E is in the lock releasing state.

In addition, by a detailed coupling relationship of the pushing protrusion portion 53, the pivot rod 45 may be smoothly pressed when the locking member 50 is slidably moved.

In addition, by a detailed coupling relationship of the gap protrusion portion 461, the elastic hook E may be smoothly held, and deformation or breakage of the elastic hook E by the holding member 40 may be prevented.

In addition, by a detailed coupling relationship of the locking member 50 in the locking operation space 22, a slide movement of the locking member 50 may be smoothly performed, and the locking member 50 may be positioned at a correct position in the lock releasing state of the elastic hook E and the lock setting state of the elastic hook E.

In addition, by a slide movement coupling relationship of the locking member 50 in the locking operation space 22, the slide movement of the locking member 50 in the locking operation space 22 may be smoothly performed.

In addition, by a coupling relationship of the lock releasing key, the slide movement of the locking member 50 in the locking operation space 22 may be clarified.

In addition, by a coupling relationship between the locking member 50 and the lock releasing key, the lock releasing key may be easily detached from and attached to the locking member 50.

As described above, an exemplary embodiment of the present disclosure has been described with reference to the drawings, but those skilled in the art will variously modify or change the present disclosure within the scope not departing from the spirit and scope of the present disclosure described in the following claims.

What is claimed is:

1. A connection cable locking device comprising:

a device body provided with a holding operation space and a locking operation space in communication with the holding operation space;

a holding member having elasticity and pivotably coupled to the holding operation space so as to hold an elastic hook provided on a connection head of a connection cable; and a locking member slidably coupled to the locking operation space so as to press the holding member, wherein the holding operation space comprises a holding engaging portion, and the holding member comprises:

an engaging coupling block provided with a block engaging portion that is engaged with and coupled to the holding engaging portion;

a support rod that protrudes on the engaging coupling block such that the support rod protrudes toward the elastic hook from the device body; and a pivot rod which has elasticity and which protrudes on the engaging coupling block such that the pivot rod protrudes toward the elastic hook from the device body.

2. The connection cable locking device of claim 1, wherein the device body comprises at least one of:

a cover wing covering the holding member that protrudes from the device body when the holding member is coupled to the holding operation space; or a rod seating portion on which a portion of the holding member is supported and seated.

3. The connection cable locking device of claim 1, wherein a holding groove portion into which the elastic hook is inserted is recessively formed at least one of an end portion of the support rod or an end portion of the pivot rod.

4. The connection cable locking device of claim 1, wherein a gap protrusion portion protrudes one of the support rod or the pivot rod, the gap protrusion portion being capable of being in contact with or in close contact with the other of the support rod and the pivot rod when an end portion of the support rod and an end portion of the pivot rod hold the elastic hook.

5. The connection cable locking device of claim 1, wherein the locking member comprises a pushing protrusion portion configured to press the pivot rod in response to a slide movement of the locking member.

6. The connection cable locking device of claim 1, wherein one of the locking operation space or the locking member comprises a locking hook, and the other of the locking operation space or the locking member comprises:

a locking reciprocating guide forming a movement path of the locking hook;

a release seating portion where the locking hook is engaged with and supported at a first side of the locking reciprocating guide; and a locking seating portion which is spaced apart from the release seating portion and where the locking hook is engaged with and supported at a second side of the locking reciprocating guide.

7. The connection cable locking device of claim 1, further comprising a lock releasing key detachably coupled to the locking member for the slide movement of the locking member.

8. A connection cable locking device comprising:

a device body provided with a holding operation space and a locking operation space in communication with the holding operation space;

a holding member having elasticity and pivotably coupled to the holding operation space so as to hold an elastic hook provided on a connection head of a connection cable; and a locking member slidably coupled to the locking operation space so as to press the holding member, wherein one of the locking operation space or the locking member comprises a locking hook, and the other of the locking operation space or the locking member comprises:

a locking reciprocating guide forming a movement path of the locking hook;

a release seating portion where the locking hook is engaged with and supported at a first side of the locking reciprocating guide; and a locking seating portion which is spaced apart from the release seating portion and where the locking hook is engaged with and supported at a second side of the locking reciprocating guide.

* * * * *